United States Patent [19]

Souma

[11] 4,180,148
[45] Dec. 25, 1979

[54] ANTI-RATTLE SPRING MEMBER FOR A DISC BRAKE PAD

[75] Inventor: Teruo Souma, Toyota, Japan

[73] Assignee: Toyota Jidosha Kogyo Kabushiki Kaisha, Aichi, Japan

[21] Appl. No.: 933,747

[22] Filed: Aug. 15, 1978

[30] Foreign Application Priority Data

Aug. 24, 1977 [JP] Japan .................................. 52-101332

[51] Int. Cl.² ............................................ F16D 65/02
[52] U.S. Cl. ..................................... 188/73.5; 188/73.6
[58] Field of Search .................... 138/73.5, 73.6, 205 A

[56] References Cited

U.S. PATENT DOCUMENTS

| | | | |
|---|---|---|---|
| 3,612,226 | 10/1971 | Pauwels et al. | 188/73.6 |
| 3,625,314 | 12/1971 | Rinker | 188/73.5 |
| 3,841,445 | 10/1974 | Rinker | 188/73.5 |
| 3,933,227 | 1/1976 | Gennes | 188/73.5 |
| 3,954,158 | 5/1976 | Rist | 188/73.5 |
| 4,034,857 | 7/1977 | Kondo et al. | 188/73.5 |
| 4,134,477 | 1/1979 | Asquith | 188/73.5 |

FOREIGN PATENT DOCUMENTS 2713360  9/1977  Fed. Rep. of Germany .......... 188/73.6

*Primary Examiner*—Edward R. Kazenske
*Attorney, Agent, or Firm*—Browdy and Neimark

[57] ABSTRACT

In a type of a disc brake wherein a pad assembly is movably retained, in a mormal direction to the disc rotor surface, by a supporting member, an anti-rattle spring, interposed between the pad assembly and the supporting member, for biasing the pad assembly in a parallel direction to the friction surface thereof, made of stainless steel and being extended a part thereof along the contour of the contacting surfaces between the pad assembly and the supporting member to be interposed therebetween.

6 Claims, 5 Drawing Figures

ANTI-RATTLE SPRING MEMBER FOR A DISC BRAKE PAD

BACKGROUND OF THE INVENTION

The present invention relates to a disc brake including an improved construction for mounting friction pad assemblies.

There has been and is now widely used a disc brake of the type in which a pair of friction pad assemblies being supported by a non-rotating member are forced against both sides of a rotating disc upon brake application. In the disc brake of such type, each of the friction pad assemblies is required to be slidably mounted on or received in the supporting member so that the pad assembly is free to move inward and outward in an axial direction along a line normal to the sides of the disc rotor. One of the typical structures for attaining this purpose has been to provide the supporting member itself with guide or abutment surfaces or ways on and along which the pad assemblies slide toward and away from the disc rotor.

It has been found, however, that such type structure of disc brake is not completely satisfactory because of the disadvantage that the pad assembly may rattle, especially when the brake is installed on automotive vehicles or other equipment involving high-frequency vibrations during operation. One solution that has been attempted to this rattling problem of the pad assembly, is to interpose an elastic material between the pad assembly and corresponding surfaces of the supporting member so that an elastic force is exerted onto the pad assembly in one given direction parallel to the friction surfaces of the pad and disc, thereby letting the pad assembly vibrate together with its supporting member as a unit. Any elastic material that may serve such a function is generally referred to as an anti-rattle spring.

Furthermore, such type of disc brake has still another disadvantage that the abutment surfaces of the pad assembly and its supporting member are easy to corrode or rust and may even stick together under certain conditions. The rusty or sticky condition of the abutment surfaces is a possible source that prevents a normal and smooth braking action. Even an extremely slight degree of rust produced on the abutment surfaces of the pad assembly and the supporting member may hinder the pad assembly from retracting to its normal position away from the disc rotor for a needed running clearance upon releasing brakes, or may cause a so-called "brake drag" complaint. Accordingly, every possible and strenuous effort has been made so far to find a solution to this brake dragging problem which may not only inflict an extra load to a vehicle engine and consequently increase the fuel cost but also induce very serious and hazardous conditions of the brake such as overheating and vapor-lock.

And what is worse, when the abutment surfaces are heavily rusted, more brake pedal pressure is needed for initial braking effect and in the worst case, the friction pad assembly may stick to its supporting member and thus fail to slide axially, thereby putting the brake in critical conditions.

The present invention has the background as described hereinbefore.

SUMMARY OF THE PRESENT INVENTION

It is a primary object of this invention to provide a disc brake provided with a means which is capable of holding the sliding resistance of the pad assembly low for a prolonged period of time by means of preventing a direct contact between the pad assembly and its supporting member.

It is another object of this invention to attain the above-mentioned purpose by means of skilful utilization of an anti-rattle spring, which is used for preventing rattling of a pad assembly when the brake vibrates.

It is still another object of this invention to provide a disc brake, which is capable of maintaining the slidability of the pad assembly, in relation to its supporting member, smooth for a prolonged period of time, by means of changing the material of the anit-rattle spring to stainless steel, and further extending a part thereof along the contour of the pad for letting the extended part interpose (intrude) deeply into the contacting surfaces between the pad assembly and its supporting member.

It is further object of this invention to provide a disc brake of simple structure provided with an anti-rattle spring of stainless steel being inexpensive in manufacturing cost thereof, whereby it is capable of holding the sliding resistance low for a prolonged period of time and allows an easy fabrication.

DETAILED DESCRIPTION OF THE PREFERRED EMBODIMENT

Referring to the figures of the drawings which show two forms of a disc brake, each constituting a preferred embodiment of the present invention, the detailed description is provided hereinafter.

Figure 1:
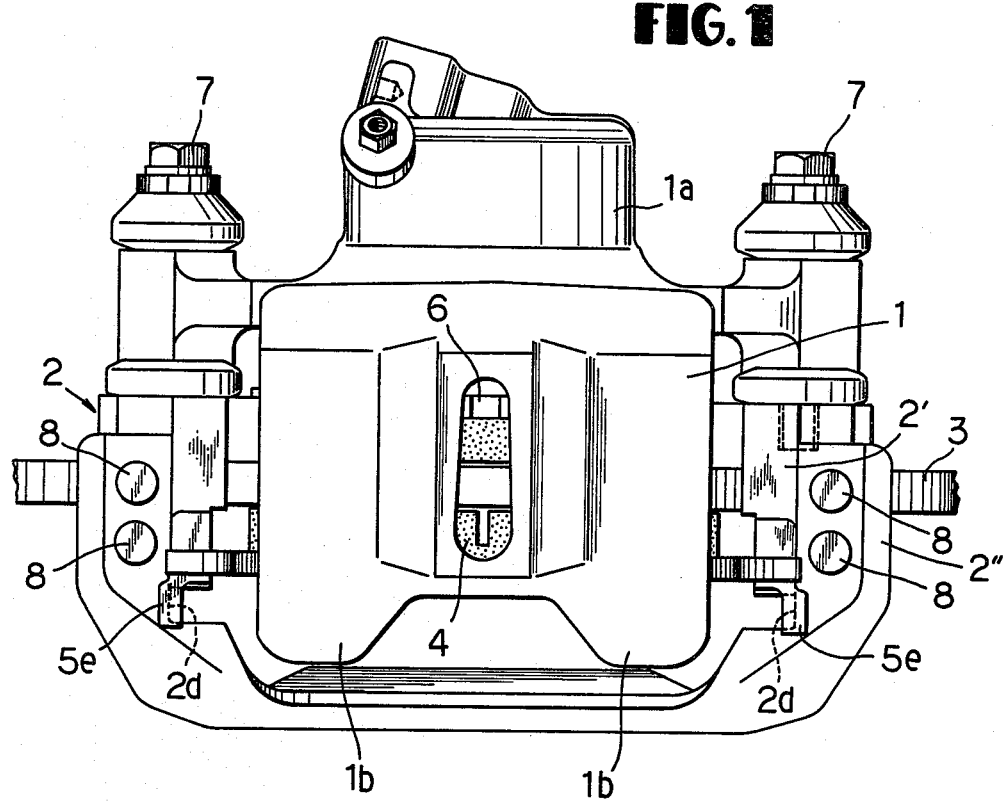
FIG. 1 is a plan view of a disc brake showing a preferred embodiment of the present invention.
Figure 2:
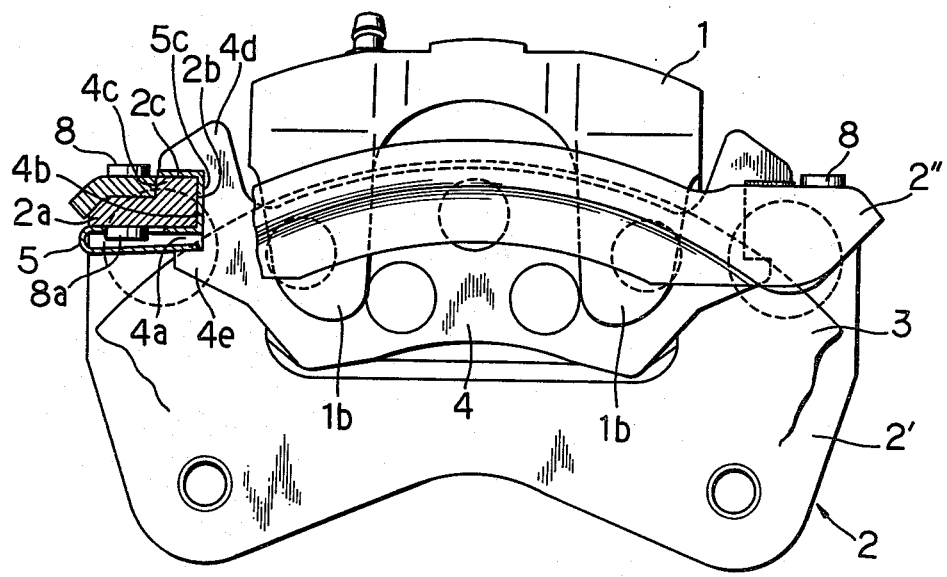
FIG. 2 is an elevational view (partially in section) of the same disc brake.
Figure 3:
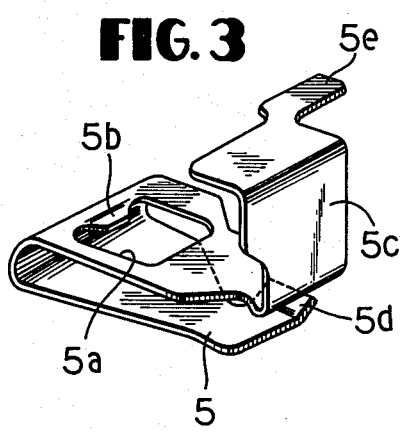
FIG. 3 is a perspective view of an anti-rattle spring to be used for the disc brake shown in FIG. 1 and FIG. 2.

FIG. 1 through FIG. 3 illustrate a preferred embodiment of the invention, wherein the outer pad side of a disc brake is constructed in accordance with the invention. A caliper 1 shown in the figures is of almost saddle-shape as a whole. In an inner side of the caliper 1, an actuator 1a (hydraulic cylinder) is formed as an integral part of the caliper housing. The caliper 1 is supported by a supporting member which is designated as a mounting bracket 2 in specific embodiments, straddling over a disc rotor 3. When an inner pad assembly 6 is forced against the inner side of the disc rotor 3 by a piston of the actuator 1a upon application of hydraulic pressure, the caliper 1 slides inwardly on a pair of slide pins 7 in an axial direction at right angle to the disc rotor 3 and as a result, reaction arms 1b opposing the actuator 1a in the inner side of the caliper 1 urges an outer pad assembly 4 against the outer side of the disc rotor 3. The mounting bracket 2 comprises a first member 2' and a second member 2''. The first member 2' includes a pair of torque-receiving arms 2a which are disposed axially and adjacent to or slightly above the periphery of the disc rotor 3. The outer pad assembly 4 is supported by the pair of torque-receiving arms 2a to which the second member 2" is secured by rivets 8.

The outer pad assembly 4 has a rectangular slot or cutout 4a at each lateral end, which engages said pair of torque-receiving arms 2a. A U-shaped anti-rattle spring 5 is installed with its upper side against a bottom surface of the torque-receiving arms 2a and a portion of its lower side resting on a lower surface of the slot 4a, whereby a downward spring force is constantly exerted onto the outer pad assembly 4. The anti-rattle spring 5 is fabricated from a stainless steel hoop for springs to a form as shown in FIG. 3, a portion thereof being removed to provide a rectangular opening 5a which receives the rivet 8 connecting the first and second members of the mounting bracket 2. Head 8a of the rivet 8 secures the anti-rattle spring 5 to the torque-receiving portion 2a. A tab 5b extending into the opening 5a is provided to assure perfect engagement of the anti-rattle spring 5 with the rivet head 8a.

An anti-friction-increasing shim portion 5c is extended, being bent along the contour of the slot 4a from the upper side end of the U-shaped spring 5, to be interposed between abutment surfaces of the outer pad assembly 4 and the torque-receiving arm 2a. This extended anti-friction-increasing shim portion 5c is bent to cover a torque-receiving surface 2b and a sliding surface 2c of the torque-receiving arm 2a, so that said two surfaces 2b and 2c do not get into direct contact with a torquetransmitting surface 4b and a sliding surface 4c of the slot 4a formed in the outer pad assembly 4.

Further, the anti-friction-increasing shim protion 5c is formed with a protruding tongue-like tab 5e at the end, shown in FIG. 3, which functions to prevent an accidental removal of the outer pad assembly 4 off the mounting bracket 2 when assembling of the two parts. The rest of this paragraph describes the reason why the tab 5e if provided and the way how it works. The previously discussed slot 4a at each end of the outer pad assembly 4 is formed with an upper overlying lip 4d and a lower underlying ledge 4e. The overlying lip 4d protrudes sideways a longer distance than the underlying ledge 4e. The ledge 4e is designed to pass in a slot 2d (shown in FIG. 1) formed in the mounting bracket 2 while the lip 4d is not so designed. This lip and ledge design of the slot 4a facilitates the installation of the outer pad assembly 4 on the mounting bracket 2 when assemblying. Actually, however, an unfinished slot 2d may have a dimensional error and permit the lip 4d to pass therein though the slot 2d ought not to permit it. Such a trouble may be prevented by covering a portion of the slot 2d with the tab 5e.

Further provision included in this anti-rattle spring 5 is an oblique tab 5d, shown in FIG. 3, which protrudes sideways with a gentle angle from the lower side of the U-shaped spring portion. The tab 5d makes it easy to mount the outer pad assembly 4 in place, with respect to the anti-rattle spring 5.

In this preferred embodiment wherein, as detailed hereinbefore, an anti-friction-increasing stainless steel shim is used to be interposed along all abutment surfaces of the slot 4a formed in the outer pad assembly 4 and of the torque-receiving arm 2a of the pad supporting member, there is absolutely no possibility that the outer pad assembly 4 and the torque-receiving arm 2a may stick together due to rust produced therebetween. This is because the anti-friction-increasing stainless steel shim, i.e., the extended portion 5c of the anti-rattle spring 5 being in direct contact with the abutment surfaces of the outer pad backing plate and the torque-receiving arm 2a, both made of steel materials, is not subject to rust that may be generated on the abutment surfaces and keeps its own surfaces smooth. Moreover, since the outer pad assembly 4 slides on the constantly smooth surfaces of the stainless steel shim, increase in the sliding resistance due to rust on the abutment surfaces may be held much less than that in any conventional disc type brakes. As a result, the overall sliding resistance of the outer pad assembly 4 may be held at a considerably low level and a smooth braking operation without a drag is assured for a prolonged period of time.

In addition, the anti-rattle spring 5 and the portion 5c extended as an anti-friction-increasing shim may serve each other as a retainer i.e. one for the other. This one-piece anti-rattle and -friction-increasing spring shim makes the installation and design thereof simpler and easier, compared with a case wherein two parts, anti-rattle spring and anti-friction-increasing shim, are separately prepared.

Figure 4:
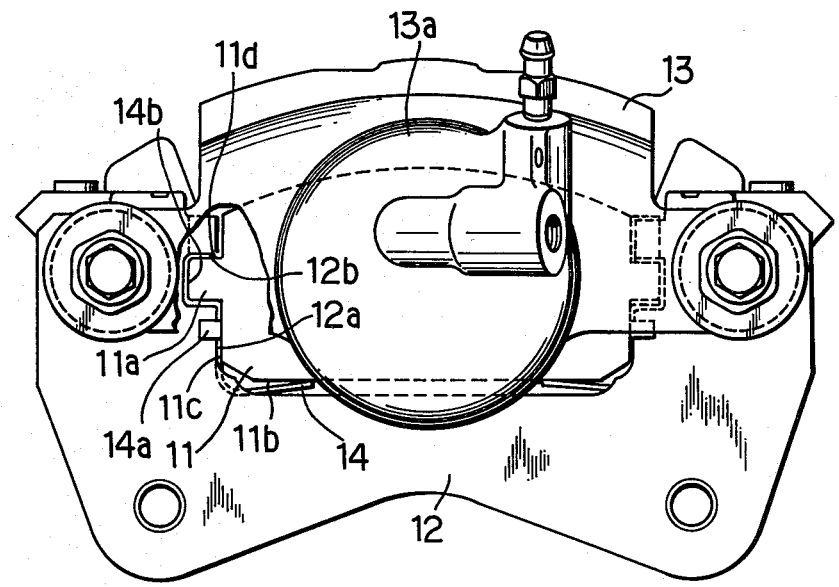
FIG. 4 is an elevational view (partially in section) of a disc brake showing another preferred embodiment of the invention.
Figure 5:
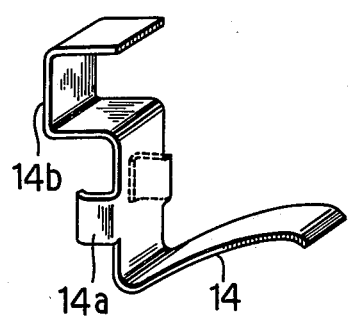
FIG. 5 is a perspective view of an anti-rattle spring to be used for the disc brake presented in FIG. 4.

FIG. 4 and FIG. 5 present another form of a disc brake embodying the invention wherein the inner pad side of the disc brake is constructed according to the invention.

An inner pad assembly 11 includes a rectangular abutment tab 11a at each end thereof which is received in a corresponding slot of almost similar shape formed in the mounting bracket 12, whereby the inner pad assembly 11 is supported by the mounting bracket 12.

A V-shaped anti-rattle spring 14 inserted between the mounting bracket 12 and a bottom surface 11b of the inner pad assembly 11 exerts constantly an upward spring force onto the inner pad assembly 11. A pair of retaining tabs 14a which clamp a portion of the mounting bracket 12 prevent the anti-rattle spring 14 from shifting out of position in an axial direction normal to the plane of FIG. 4.

One side of the V-shaped anti-rattle spring 14 interposes between a torque-transmitting surface 11c of the inner pad assembly 11 and a torque-receiving surface 12a of the mounting bracket 12 so as to avoid a direct contact of the two surfaces 11c and 12a. The same side of the spring 14 extends further along the contour of the abutment tab 11a of the inner pad assembly 11 which is received in the slot formed in the mounting bracket 12. This extended portion 14b functions to prevent a direct contact of sliding surfaces 11d of the tab 11a with the corresponding surfaces 12b of the slot. As the effectiveness of the disc brake presented in this preferred embodiment is substantially identical to that clarified in the previous embodiment, the detailed description thereof is omitted herein.

While each of the two forms of a disc brake herein described constitutes a preferred embodiment of the present invention, it is to be understood that modifications and changes may be made therein according to variations in shape and other design features of the friction pad assembly and its supporting member, without departing from the scope of the invention which is defined in the appended claim.

What is claimed is:
1. A disc brake having a disc axis, the brake comprising:
 (a) a disc rotor rotatable about said disc axis;
 (b) a stationary supporting member having a pair of circumferentially spaced torque receiving arms extending substantially parallel to said disc axis, said arms being provided with a pair of substan- tially radially extending pad-insert-slots formed on mutually confronting portions thereof;

(c) a pad assembly having, on each lateral end, a respective engaging-slot for slidably engaging with respective ones of said torque receiving arms, a respective ledge on the nearer side of each said engaging-slot to said disc axis; and a respective lip, protruding laterally beyond each said ledge, formed on the remoter sides of said engaging slots from said disc axis;

(d) an actuator for urging said pad assembly onto said disc rotor; and (e) a pair of anti-rattle springs made of stainless steel material, each of said anti-rattle springs being an integrally formed element with (1) an anti-rattling spring portion disposed between said pad assembly and respective ones of said torque receiving arms for biasing said pad assembly in a direction normal to said disc axis to prevent rattling of said pad assembly when the brake is in vibration, (2) an anti-friction-increasing shim portion extending from said anti-rattling spring portion to cover a contacting surface of the corresponding said torque receiving arm upon which said pad assembly engaging-slot is engageable, to prevent friction from increasing due to rust between said pad assembly and the corresponding said torque receiving arm, and (3) a covering portion extending from said anti-friction-increasing shim portion for covering an inner portion of the corresponding said pad-insert-slot so as to restrict the size of opening of the same such that the corresponding said ledge is allowed to pass through and the corresponding said lip is not allowed to pass thereby facilitating radial positioning of said pad assembly to said torque receiving arms.

2. A disc brake claimed in claim 1, wherein said covering portion is a tab extended from said anti-friction-increasing shim portion.

3. A disc brake claimed in claim 1, wherein said anti-rattling spring portion and said anti-friction-increasing shim portion of said anti-rattle spring serve each other as a retainer.

4. A disc brake claimed in claim 1, wherein said supporting member includes a respective member secured to the corresponding said torque receiving arms thereof by a rivet having a rivet head, and the corresponding said anti-rattle spring has an opening to be fitted on said rivet head, whereby a shifting of the corresponding said anti-rattle spring along the corresponding said torque receiving arm is virtually prevented.

5. A disc brake claimed in claim 1, wherein each said anti-rattling spring portion is of U-shape, and one end of said spring portion of U-shape is abutted to a corresponding said torque receiving arm and the other end of the spring portion of U-shape is abutted to the corresponding said ledge of said pad assembly, thereby constantly biasing said pad assembly in an approaching direction to said disc axis.

6. A disc brake claimed in claim 5, wherein said anti-rattling spring portion of U-shape is provided with an oblique tab extended, in a direction parting from said disc rotor, from the engaging-side-edge of said other end of the spring portion of U-shape and bent obliquely in a direction approaching to the corresponding said torque receiving arm, for facilitating the engaging of a corresponding said ledge with said anti-rattling spring portion.

* * * * *